US012586216B2

(12) United States Patent
Pedrizzetti et al.

(10) Patent No.: US 12,586,216 B2
(45) Date of Patent: Mar. 24, 2026

(54) METHOD OF DETERMINING A MOTION OF A HEART WALL

(71) Applicant: Medis Associated B.V., Leiden (NL)

(72) Inventors: Gianni Pedrizzetti, Prato (IT); David Jonathan Hautemann, Bleiswijk (NL); Pieter Hendrik Kitslaar, Leiden (NL); Johan Hendrikus Christiaan Reiber, Rotterdam (NL)

(73) Assignee: Medis Associated B.V., Leiden (NL)

( * ) Notice: Subject to any disclaimer, the term of this patent is extended or adjusted under 35 U.S.C. 154(b) by 285 days.

(21) Appl. No.: 18/368,111

(22) PCT Filed: May 6, 2022

(86) PCT No.: PCT/NL2022/050248
§ 371 (c)(1),
(2) Date: Sep. 14, 2023

(87) PCT Pub. No.: WO2022/235162
PCT Pub. Date: Nov. 10, 2022

(65) Prior Publication Data
US 2025/0078288 A1      Mar. 6, 2025

(30) Foreign Application Priority Data
May 7, 2021    (NL) ...................................... 2028172

(51) Int. Cl.
*G06T 7/246* (2017.01)
*G06T 7/00* (2017.01)

(52) U.S. Cl.
CPC ............ *G06T 7/248* (2017.01); *G06T 7/0016* (2013.01); *G06T 2207/10016* (2013.01); *G06T 2207/30048* (2013.01)

(58) Field of Classification Search
None
See application file for complete search history.

(56) References Cited

U.S. PATENT DOCUMENTS

2006/0074315 A1* 4/2006 Liang ........................ A61B 8/08
600/450
2006/0173328 A1 8/2006 Fan et al.
(Continued)

FOREIGN PATENT DOCUMENTS

| WO | 2004008955 A2 | 1/2004 |
| WO | 2006041549 A1 | 4/2006 |
| WO | 2007090093 A2 | 8/2007 |

OTHER PUBLICATIONS

Slager et al., "Quantitative Assessment of Regional Left Ventricular Motion Using Endocardial Landmarks," JACC vol. 7, No. 2, Feb. 1986, pp. 317-326 (Year: 1986).*
(Continued)

*Primary Examiner* — Soo Shin
(74) *Attorney, Agent, or Firm* — Banner & Witcoff, Ltd.

(57) ABSTRACT

A sequence of images acquired consecutively in time at fixed time intervals is received, the images comprising image data of at least part of a heart having a heart wall, identifying, in each image, at least part of the heart wall and defining, in each image, at least one vector point on the identified heart wall. The method further comprises determining motion of the vector point over time, based on the sequence and receiving a first reference related to the heart. Based on the tracking of the vector point and the first reference, a motion vector is determined indicating motion of the vector point relative to the reference.

19 Claims, 4 Drawing Sheets

(56) References Cited

U.S. PATENT DOCUMENTS

| | | | |
|---|---|---|---|
| 2008/0095417 A1* | 4/2008 | Pedrizzetti | A61B 8/483 |
| | | | 382/128 |
| 2021/0105999 A1* | 4/2021 | Abicht | A01K 67/0276 |
| 2025/0032079 A1* | 1/2025 | Tobón Gómez | A61B 6/504 |

OTHER PUBLICATIONS

Slager et al, JACC, 7:2 (1986) 317-326.
XP-000716148, A.F. Bowyer, et al., "Description of a Novel Micro-computer Program to Analyze Left Ventricular Segmental Wall Motion During Normal Sinus Rhythm and Sinus Tachycardia", 358 I.S.A. Transactions 25 (1986) No. 2, Research Triangle Park, North Carolina, USA.
International Search Report and Written Opinion—PCT/NL2022/050248—mailing date Nov. 1, 20220.

* cited by examiner 202
204
206
208
210
212
214
216
218
220
222
224
226
228
230
232
234
236
238
240
242
244
246
248

200

300

500

METHOD OF DETERMINING A MOTION OF A HEART WALL

CROSS-REFERENCE TO RELATED APPLICATIONS

This application is a U.S. National Stage application under 35 U.S.C. § 371 of International Application PCT/NL2022/050248 (published as WO 2022/235162 A1), filed May 6, 2022, which claims the benefit of priority to Application NL 2028172, filed May 7, 2021. Each of these prior applications is hereby incorporated by reference in its entirety.

TECHNICAL FIELD

The various aspects and variations thereof relate to a method and device for assessment of functioning of the myocardium tissue for providing pumping function of the heart.

BACKGROUND

For assessment of the functioning of the heart and subsequent assessment whether this functioning is in accordance with reference data or not to enable a cardiologist to diagnose any pathological issues, various technologies are available. Such techniques are analysis of an electrocardiogram and assessment of information recorded multiple imaging technologies.

SUMMARY

It is preferred to provide an improved technique for evaluation of the functioning of the myocardial tissue and pumping function of the heart and to provide data for such evaluation and, optionally, to provide the data to a cardiologist or other medical practitioner, preferably via an electronic display screen.

A first aspect provides, in an electronic computing device, a method of determining a motion of an heart wall. The method comprises receiving a sequence of images acquired consecutively in time at fixed time intervals, the images comprising image data of at least part of a heart having a heart wall, identifying, in each image, at least part of the heart wall and defining, in each image, at least one vector point on the identified heart wall. The method further comprises determining motion of the vector point over time, based on the sequence and receiving a first reference related to the heart. Based on the tracking of the vector point and the first reference, a motion vector is determined indicating motion of the vector point relative to the reference.

By determining one or more motion vectors, motion of one or more parts of the heart wall may be determined, in particular motion of parts of a wall of a specific cavity, like the left ventricle, may be determined relative to the reference. With the reference being provided within the cavity, motion of the wall relative to, for example, a central point in the cavity may be determined. The magnitude of the motion, in particular in the direction to or from the reference, may provide an indication of a quality of a pumping function of the heart and the particular cavity in particular. A part of the wall may move parallel to the tangential plane of the identified wall. In such case, the movement contributes little or not to the pumping function. With the reference provided in the cavity—in the model—and determining the motion vector indicating motion of the vector points towards or away from the reference—a reference point, a reference curve, or a combination thereof—the part of the movement contributing to pumping may be determined. The identified heart wall may be one of the outer wall of a heart, the inner wall of a specific cavity or another reference, for example between the outer wall and the inner wall and is preferably provided as a curve.

The first aspect may comprise identifying a set of vector points on the heart wall, assigning a first sub-set of the set of vector points to a first region of the heart wall, determining movement of the vector points in the first sub-set over time, based on the determined movement of the vector points in the first sub-set, determining a first region motion vector of the first region indicating motion of the region relative to the first reference.

According to cardiological medical standards, an endocardial wall of a particular cavity may be divided in particular section. Providing motion data per standardised region provides improved input to a medical practitioner for setting a diagnosis.

The first aspect may further comprise assigning a second sub-set of the set of vector points to a second region of the heart wall, determining motion of the vector points in the second sub-set over time, and, based on the tracking of the vector points in the second sub-set, determining a second region motion vector of the second region indicating motion of the region relative to the first reference.

By determining motion vectors for multiple regions, more information may be provided to medical practitioners, allowing them to compare motion of various sections.

The first reference may be different from the second reference. This may allow improved accuracy.

The method my comprise determining, based on the determined motion of at least part of the vector points, a motion of the heart over time, and adjusting the first region motion vector based on the determined motion of the heart to compensate for the motion of the heart.

During heart beat cycle, the heart moves in a body of a subject. With the subject being stabilised during image acquisition, this means that the actual motion of the heart is captured by the images. Hence, the position of the heart may not be the same in each acquired image or acquired frame. By determining a common motion in vector points or a motion of the reference—determined relative to at least one position of the identified heart wall contour —, motion of the heart in particular heart beat and motion of the heart from one frame relative to another frame may be determined. This determined heart motion may be used to adjust the determined motion vectors related to vector points on the identified heart wall, so for example on an identified heart wall contour.

The method may comprise determining an inward vector component of the motion vector, the inward vector component being a component of the motion vector parallel to a line between the first reference point and the vector point. As indicated above, in particular inward motion of the endocardial wall as represented by the identified heart wall is relevant to evaluation of a pumping function of a heart.

The motion vector may be based on a maximum displacement of the vector point relative to the first reference point. Displacement of blood and an amount of blood displaced in a heart beat may be determined by the maximum displacement of sections of or points on the heart wall, between the end of the systolic phase and the end of the diastolic phase.

The reference may be provided between the base and the apex, in particular between one third and two third of that trajectory, more in particular between half that trajectory and a point generally at a third from the base on that trajectory. the reference may comprises single reference point, a multitude of reference points, an open curve, a closed curve, or any combination thereof. A closed curve generally defines an area. An open curve may be provided from a first location closer to the base to a second point further away from the base. If the reference comprises multiple points, such points may be provided on a curve, either closes or open. If the reference comprises multiple points, each reference point may correspond to a vector point on the identified heart wall.

The method may further comprise receiving a reference motion value indicating a reference amount of motion of the vector point relative to the reference point, deriving a vector motion value based on the motion vector, calculating a motion deviation value providing an indication of a difference between the vector motion value and the reference motion value; and providing the motion deviation value for displaying on an electronic display. This provides a medical practitioner with data related to a particular subject, compared to a reference group.

A second aspect provides a computer program product comprising computer executable code causing a processing unit of a computer, when the code is loaded in the processing unit or a memory connected to the processing unit, to execute the method of the first aspect.

A third aspect provides a non-transitory computer readable medium comprising the computer program product of the second aspect.

A fourth aspect provides an electronic computing device comprising a data acquisition module arranged to receive a sequence of images acquired consecutively in time at fixed time intervals, the images comprising image data of at least part of a heart having an heart wall, an image processing module arranged to identify, in each image, at least part of the heart wall, define, in each image, at least one vector point on the heart wall, track the vector point over time, based on the sequence, a motion calculation module arranged to receive a first reference point related to the heart, determine, based on the tracking of the vector point and the reference point, a motion vector indicating motion of the vector point relative to the reference point.

BRIEF DESCRIPTION OF THE DRAWINGS

The various aspects and variations thereof will be discussed below in further detail in conjunction with drawings. In the drawings:

FIG. 4 B: shows wall contours of a heart having a decreased pumping functionality.

DETAILED DESCRIPTION

Figure 1:
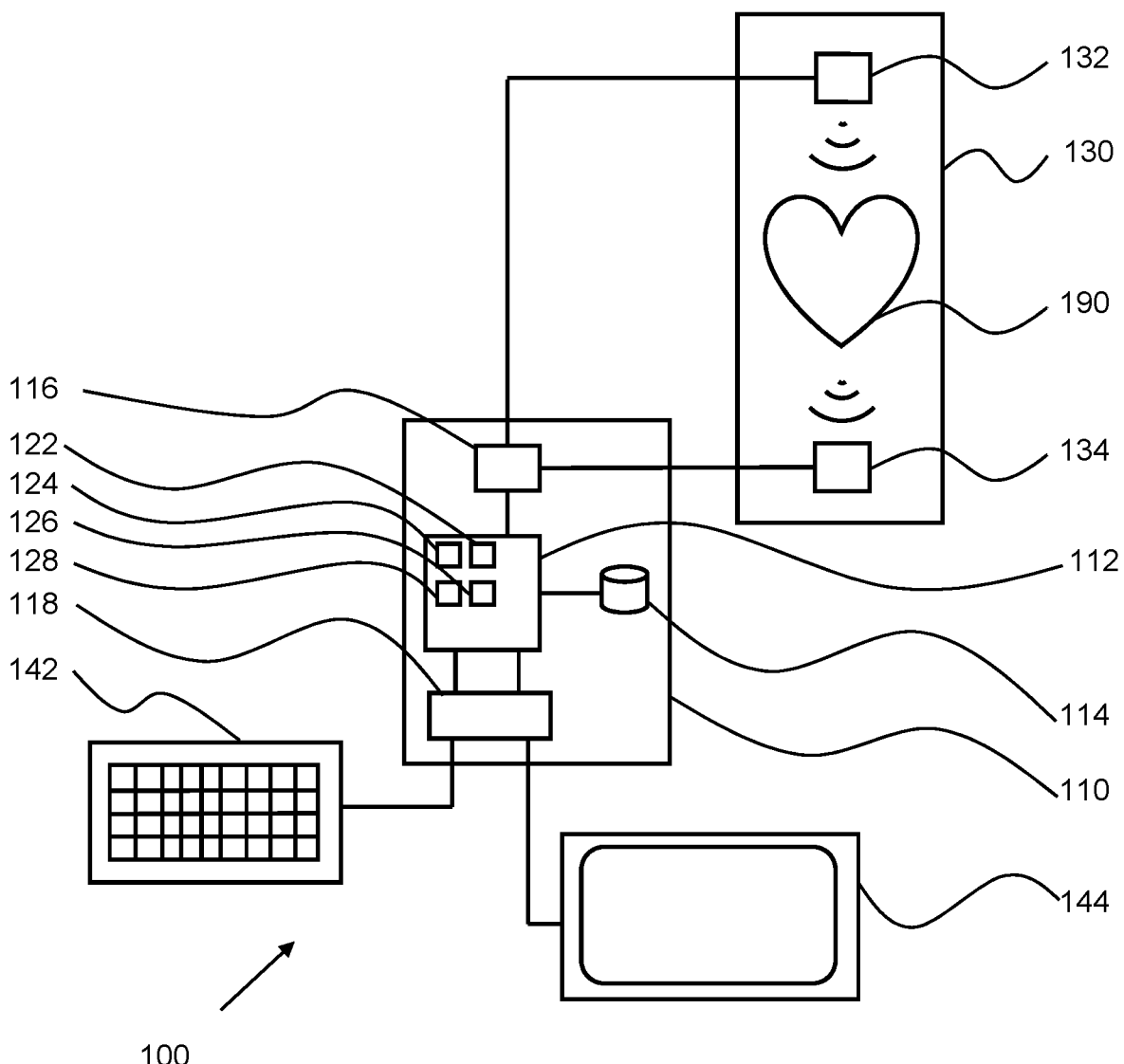
FIG. 1: shows a medical imaging system.

FIG. 1 shows a medical imaging system 100. The medical imaging system 100 comprises a control device 110 for controlling the system 100. The control device 110 comprises a central processing unit 112, a storage module 114, a user interface controller 118 and an imaging controller 116. The control device 110 is, via the user interface controller 118, connected to a keyboard 142 as a user input device and to an electronic display screen 144 as a user output device.

The imaging controller 116 is connected to an imaging transmitter 132 and an imaging receiver 134. The imaging transmitter 132 sends out energy—electromagnetic waves like X-ray radiation, sounds waves and ultrasound waves in particular, other energy or a combination thereof—to the imaging receiver 134. The imaging transmitter 132 and the imaging receiver 134 are part of a medical imaging system 130. The medical imaging system 130 may be an MRI system, a CT system, a standard X-Ray system, an ultrasonic imaging system, another imaging system, or a combination thereof. The medical imaging system is arranged to obtain imaging data of a heart 190 of a mammal, a human in particular. The imaging data preferably comprises images divided by approximately constant time intervals.

The imaging controller 116 may be arranged to process the imaging data receiver 134 to provide a two-dimensional representation, a three-dimensional reconstruction of the heart 190 or any other part of a body. The imaging controller 116 may further be arranged to provide two-dimensional cross-sections of the three-dimensional reconstruction. Additionally or alternatively, two-dimensional images as acquired are passed through to the central processing unit 112. Some or all steps may also be executed by the central processing unit 112, instead of or in conjunction with the imaging controller 116. The imaging controller and the central processing unit 112 may be included in one and the same physical entity.

The central processing unit 112 comprises an edge detection subunit 122 as a wall detection unit, a segmenting subunit 124 for segmenting data, a motion detection subunit 126 for tracking of data points across frames divided in time and a vector computing subunit 128 for execution vector operations. The various subunits may be hardwired, programmed, in any way, including temporary, permanent, in a volatile manner, in a non-volatile manner, other, or combination thereof. The central processing unit 112 may be further arranged to execute the method according to the first aspect and methods as discussed below, with or without any option indicated and any variation thereof. In any chosen realisation, the unit eventually provides a number of positions on the image, where such positions change during time. The positions are identified by their coordinate values and represent places of interest therein.

The storage module 114 is arranged to have image data stored thereon that may be acquired by means of the medical imaging system 130, as directly obtained as well as in a processed way. Furthermore, the storage module 114 may have data stored thereon comprising code executable by the central processing unit 112, enabling the central processing unit to operate as discussed above.

Figure 2:
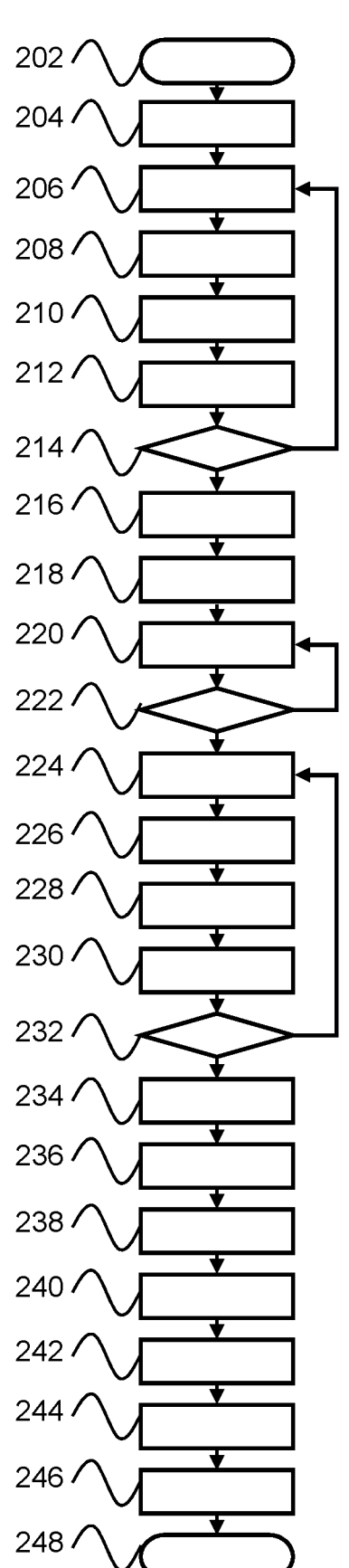
FIG. 2: shows a flowchart.

FIG. 2 shows a flowchart 200 depicting a procedure that may be carried out by the system 100 and the control device 110 in particular. The parts of the flowchart 200 may be summarised as indicated below:

| | |
|---|---|
| 202 | start procedure |
| 204 | receive images |
| 206 | identify wall |
| 208 | segment wall |
| 210 | define points on the wall |
| 212 | define reference |
| 214 | all images done? |
| 216 | identify points on all frames tracking points frame to frame or a combination thereof |
| 218 | define cardiac cycle boundaries |
| 220 | define motion part |
| 222 | repeat for all cycles if many cycles are present |
| 224 | determine motion vector |
| 226 | determine vector component parallel to line between reference and point |

5

-continued

| 228 | determine motion vector of each point or of a segment or a group of points |
|-----|------------------------------------------------------------------|
| 230 | determine motion vector component towards reference |
| 232 | all points done? |
| 234 | determine overall movement of wall and reference points |
| 236 | calculate adjustment data |
| 238 | adjust data values based on adjustment data |
| 240 | obtain reference value |
| 242 | calculate motion deviation |
| 244 | display deviation data |
| 246 | display vector component data towards reference |
| 248 | end procedure |

The procedure starts in a terminator 202 and proceeds to step 204 in which a sequence of images is obtained from the heart 190. The images are preferably obtained with approximately constant intervals between image acquisition moments. The images may be provided as a stream with frames. The images are preferably provided such that in the two-dimensional area of a cardiac cavity under scrutiny is as large as possible. For example, if operation of the left ventricle is to be assessed, the two-dimensional images in the sequence are provided under such angle that the line from base to apex is as long as possible, preferably at the end of the diastolic phase—or any other moment within the heartbeat cycle.

Alternatively or additionally, the area of the left ventricle on images is as large as possible at the end of the diastolic phase. In particular if two-dimensional images are provided based upon a three-dimensional model, this option is feasible. Otherwise, the medical imaging system 130 and the subject under scrutiny are properly positioned relative to one another. In other examples, the various steps discussed below are executed on a three-dimensional model. In the latter case, the images received are three-dimensional images.

Figure 3:
FIG. 3: shows a wall contour of a left ventricle.
Figure 3:
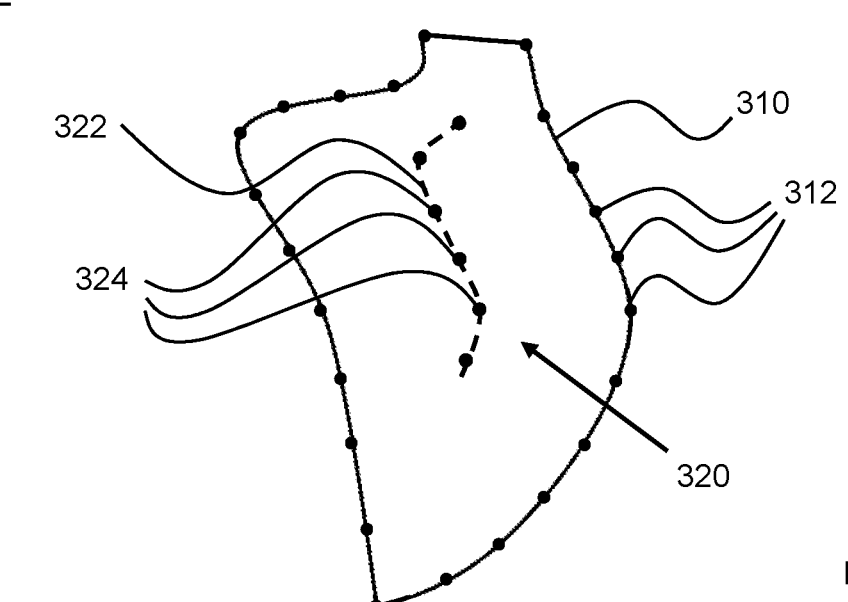

In step 206, a wall contour of the heart 190 is identified in images of the stream or other sequence of image data. The wall contour may be detected by means edge detection subunit 122 or another detection subunit, including receiving manual input indicating a contour, that is arranged to detect the applicable wall. FIG. 3 shows a wall contour 310 in a schematic representation 300 of the left ventricle of the heart 190. The wall may be defined or identified along the middle of the myocardium between the inner side and the outer side of the heart 190, along the endocardial wall, along the outer wall of the heart 190, other points of physiological interest in the cardiac tissue, or a combination thereof.

In step 208, the wall thus identified is segmented, which may be done by means of the segmenting subunit 124. The wall may be segmented in accordance with a pre-defined scheme, based on established defined areas of the endocardial wall or the myocardium. Alternatively or additionally, the segments are defined based on size of each segment. In such case, the total number of segments defined may depend on the size of the heart.

In step 210, wall points 312 are defined on the wall contour 310 as vector points. The wall points 312 may be placed on pre-determined locations relative to known segments like, for example, segments of the myocardium or endocardial wall having been specifically defined in the science of cardiology. Alternatively or additionally, the wall points 312 are defined at pre-determined distances relative to one another. Subsequently, if segments have been defined, the wall points 312 are assigned to the segment in which they are defined.

In step 212, a motion reference 320 is defined within the schematic representation 300. The motion reference 320 may be a straight line or a curved line—a curve —, a single point, a finite set of points, other or a combination thereof. Within this context, a curve or a line may be interpreted as a set of points. Points of a set of points, either finite or infinite, may be provided on a curve or a line.

Preferably, the motion reference 320 is provided relative to the apex and/or base of the heart 190 as provided by the schematic representation 300. More in particular, the motion reference 320 is provided between one third and two third of the distance between base and apex, more in particular between half and two third of the distance between base and apex, for example based on the distance between apex and base at the end of the diastolic phase. The motion reference may coincide with a physiological direction, like the line between apex and base or a line perpendicular thereto.

In FIG. 3, the motion reference 320 is depicted as a reference line 322 with reference points 324 defined thereon. It is noted that the motion reference 320 can vary during time because it is preferably defined relative to points of the heart that moves during a heartbeat cycle. Such point may be the base and the apex.

Optionally, if the motion reference 320 is not a single point but as a finite set of reference points 324 or a reference curve 322 or reference line 322, particular wall points 312 may be assigned to a particular reference point 324 or to a particular point on the reference curve 322 or reference line 322. In step 214, it is checked whether all applicable images or frames received have been assessed. It may be noted that not every image received has to be assessed—also every second image may be assessed, for example. If not all images have been assessed, the procedure jumps back to step 206.

If all images have been processed as described above, the procedure continues to step 218 in which images may be grouped on per heartbeat basis, by determining cardiac cycle boundaries. The cardiac cycle boundaries may be determined based on size of the left ventricle, based on electrical signals (electrocardiogram), other, or a combination thereof.

In step 220, motion of wall points is obtained over time, for example by means of tracking, the motion detection subunit 126. Such may be done on a per cycle basis, if image data is grouped by cycle. If not, motion of each wall point is tracked over a particular interval in time—over the full acquired stream or at least part thereof. If the motion is tracked on a per-cycle basis, step 222 checks whether all cycles have been tracked. If motion is not per cycle, step 222 may be superfluous.

Based on the motion of the points, the vector computing subunit 128 computes a motion vector per wall point 312 or per segment in step 224. The motion vector may indicate a measure of motion like the maximum displacement or the differential displacement between two phases of the cardiac cycle, in a particular direction, based on a particular reference. In a particular case, an average of measure of motion may be provided as a general measure for a segment, like an average of maxima or an average of minima. The measure of displacement may in particular be determined for one heartbeat cycle. Alternatively, the motion vector may indicate a specific component of a specific vector component of the wall point motion parallel to a line from the wall point 312 to the motion reference 320, from the end of the systolic phase to the end of the diastolic phase. In the latter case, the motion vector or a reference motion vector component is always directed towards the motion reference or away from the motion reference.

Figure 4:
FIG. 4 A: shows wall contours of a healthy heart.
Figure 4:
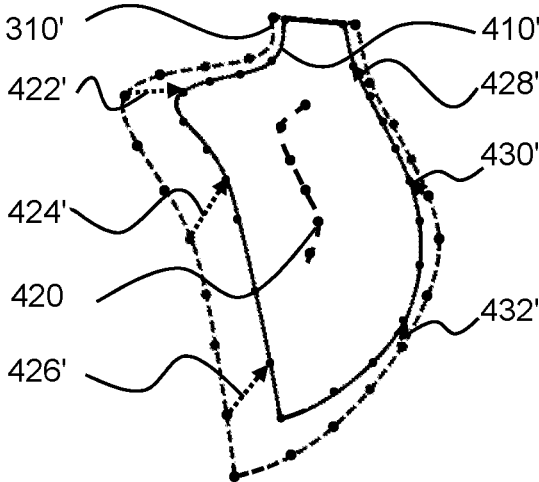

FIG. 4 A shows a first wall contour 310 at the end of the diastolic phase and a second wall contour 410 at the end of the systolic phase. FIG. 4 A also shows a first motion vector 422, a second motion vector 424, a third motion vector 426, a fourth motion vector 428, a fifth motion vector 430 and a sixth motion vector 432. In this case, the motion vectors indicate movement of each wall point 312 between the end of the diastolic phase and the end of the systolic phase. The case shown by FIG. 4 A relates to a healthy heart. In another implementation, the motion vector may be determined as a difference vector between a first vector from a wall point 312 to the reference 320 and in particular a reference point 324 at the end of the diastolic phase on the first hand and a second vector from the wall point 312 to the reference 320 and in particular a reference point 324 at the end of the systolic phase on the first hand.

The motion vector is thus determined based on a first location of the wall point 312 at the end of the diastolic phase, a first location of the wall point 312 at the end of the systolic phase and the location of the reference 320, optionally on location of reference points 324 provided thereon. In one example, each wall point 312 is associated with a specific, optionally unique, reference point 324. These reference points may be located on the reference curve 322. Furthermore, these reference points may be spaced apart.

FIG. 4 B shows another case. FIG. 4 B shows a first wall contour 310' at the end of the diastolic phase and a second wall contour 410' at the end of the systolic phase. FIG. 4 B also shows a first motion vector 422', a second motion vector 424', a third motion vector 426', a fourth motion vector 428', a fifth motion vector 430' and a sixth motion vector 432'. Also in this case, the motion vectors indicate movement of each wall point 312 between the end of the diastolic phase and the end of the systolic phase. The case shown by FIG. 4 B relates to a heart having an issue with the myocardial tissue near the apex and the inferior wall, at the right side of FIG. 4 B.

Based on the determined motion vectors, a component of the motion vectors parallel to a line between the applicable wall point 312 and the motion reference 320 is determined in step 226. Based on the determined motion vectors determined in step 224, motion vectors per segment may be determined in step 228. Such segment motion vector may be the average or median of the wall point motion vectors for wall points 312 associated with the applicable segment. Either based on the segment motion vectors or based on the vector components determined in step 226 or based on both, a segment motion vector component of the segment motion vector parallel to a line between the applicable segment and the motion reference 320 is determined in step 230. In step 232 is checked whether all segments and/or all wall points 312 have been assessed by the vector computing subunit 128. If not, the process branches back to step 224.

If all segments and/or all wall points 312 have been assessed by the vector computing subunit 128, the overall movement of the heart 190 or of the wall contour 310 during a cycle may be determined in step 234. During a heartbeat cycle, the heart may move from left to right in the body and back. This movement may be detected based on the information provided by the movement of the wall points 312, for example by means of tracking of the wall points 312, and for example by determining common motion components over time of all or at least part of the determined motion vectors. This global movement may applied to obtain the motion of the motion reference 320 or, the other way round, the motion of the motion reference 320 can be directly detected from the images and taken as representing the overall motion. The overall motion as well as the motion of the motion reference 320—one or more curves, parts thereof, points thereon, other points or a combination thereof —, lines can be considered in their entire vector value, or they can be limited to a component of the motion vector parallel to a physiological direction, like the longitudinal or transversal with respect to the orientation of the heart. Based on the determined overall motion of the heart 190 during a heartbeat cycle, a compensation factor may be determined as adjustment data in step 236 to adjust motion of wall points 312 or segments relative to the motion reference 320 over a cycle for motion of the heart 190.

Using the adjustment data, all, some, one—or none—of the motion data values discussed above—vectors, vector components and motion paths—may be adjusted for motion of the heart 190 during a cycle in step 238, yielding adjusted motion data values.

In step 240, reference values for motion values are obtained. The reference values may relate to at least one of motion tracks, wall point motion vectors, wall point motion vector components relative to the motion reference, segment motion vectors, segment motion vector components relative to the motion reference, other motion values or a combination thereof.

In step 242, based on the reference motion values and motion values determined and calculated as discussed above, motion deviation values are calculated. The deviation values may be at least one of a ratio of the motion vector value and the reference motion value or the inverse thereof, a difference between the motion vector value and the reference motion value, an absolute value of the difference between the motion vector value and the reference motion value, a ratio of the difference between the motion vector value and the reference motion value on one hand and the reference motion value on the other hand or the inverse thereof, a ratio of the absolute value of the difference between the motion vector value and the reference motion value on one hand and the reference motion value on the other hand or the inverse thereof, other, or a combination thereof.

Figure 5:
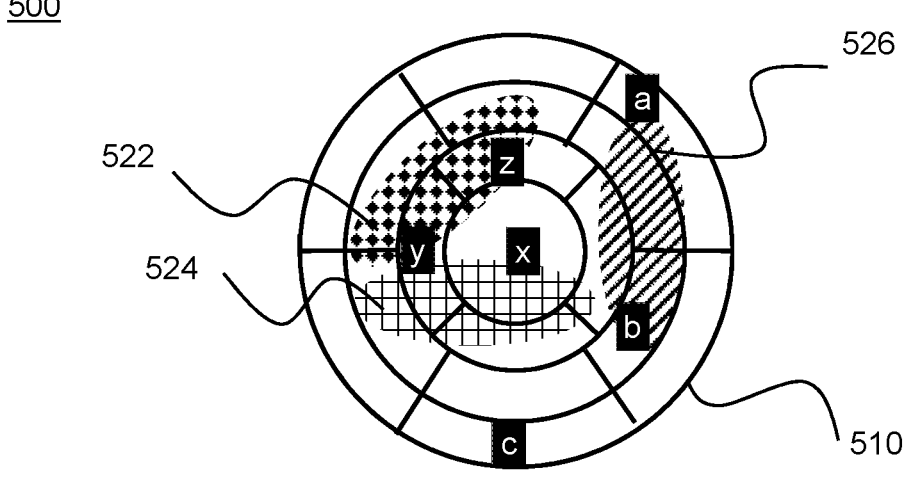
FIG. 5: shows a bullseye plot.

With the motion data processed and vector and vector component data calculated, as well as the deviation data having been calculated, at least part of the available data may be displayed on the electronic display screen 144. In step 244, the deviation data is displayed. FIG. 5 shows a bullseye plot 500. The bullseye plot 500 is based on a bullseye structure 510. The bullseye structure 510 is divided in a number of sectors, the number typically ranges between 16 and 18, although it may vary among the different modalities and with guidelines, each sector may be representing a section of the endocardial wall of the heart 190. Alternatively, each sector of the bullseye structure represents a sector of the wall contour 310 as discussed above.

In the bullseye structure 510, the deviation data may be plotted by means of different colours, different colour intensities, different shadings, different hedgings, other, or a combination thereof as depicted by FIG. 5. Alternatively or additionally, the deviation data is displayed by means of numerical of alphanumerical data. In the bullseye plot 500, a first deviating section 522, a second deviating section 524 and a third deviation section 526 are indicated. The deviation may be positive or negative, depending on how the deviation data is calculated. In FIG. 5, areas with no specific data have no or little deviation in the motion data compared to reference data.

In step 246, vector component data towards the motion reference 320 is displayed in the bullseye plot 500. As shown in FIG. 5, this vector data is displayed by means of alphanumerical or numerical data. Alternatively or additionally, this vector data may be displayed by means of colour data, intensity data or other, as discussed above in conjunction with step 244.

In the bullseye plot 500, the deviation data is displayed such that different parts of the sectors may provide different data. And the vector component data is displayed per sector of the bullseye. If multiple data values for the same entity are available for one sector, further processing of data may be required, for example taking a median or average of the values for all data points within a sector. In an alternative, the deviation data may be displayed on a per-sector basis. In an alternative, the vector data may be displayed with multiple data values per sector.

After at least part of the data thus discussed has been processed and displayed, the procedure ends in step 248.

The invention claimed is:

1. In an electronic computing device, a method of determining a motion of a heart wall, the method comprising:
receiving a sequence of images acquired consecutively in time at fixed time intervals, the images comprising image data of at least part of a heart having a heart wall, identifying, in each image, at least part of the heart wall; defining, in each image, at least one vector point on the identified heart wall;
tracking the vector point over time, based on the sequence;
receiving a first reference related to the heart;
based on the tracking of the vector point and the first reference, determining a motion vector indicating motion of the vector point relative to the reference,
wherein the motion vector is determined as a difference vector between (i) a first vector from the vector point to the first reference at the end of the diastolic phase in a cardiac cycle, and (ii) a second vector from the vector point to the first reference at the end of the systolic phase in the cardiac cycle.

2. The method according to claim 1, further comprising:
identifying a set of vector points on the heart wall;
assigning a first sub-set of the set of vector points to a first region of the heart wall;
tracking the vector points in the first sub-set over time;
based on the tracking of the vector points in the first sub-set, determining a first region motion vector of the first region indicating motion of the region relative to the first reference.

3. The method according to claim 2, further comprising:
assigning a second sub-set of the set of vector points to a second region of the heart wall;
tracking the vector points in the second sub-set over time;
based on the tracking of the vector points in the second sub-set, determining a second region motion vector of the second region indicating motion of the second region relative to a second reference.

4. The method according to claim 3, wherein the first reference is different from the second reference.

5. The method according to claim 2, further comprising:
determining, based on the tracking of at least part of the vector points, a motion of the heart over time;
adjusting the first region motion vector based on the determined motion of the heart to compensate for the motion of the heart.

6. The method according to claim 5, wherein determining the motion of the heart is based on determining a common component in the motion vectors of at least part of the vector points.

7. The method according to claim 1, further comprising:
defining, in each image, multiple vector points on the identified heart wall;
receiving, for each vector point, a reference related to the heart;
tracking the vector points over time relative to the corresponding reference, based on the sequence;
based on the tracking of the vector points, determining, for each of the vector points, motion vectors indicating motion of the vector points relative to the corresponding reference.

8. The method of claim 7, wherein the references are provided on a curve.

9. The method according to claim 1, further comprising:
determining, based on the tracking of either the at least one vector point or the reference over time, a reference motion vector indicating motion of the reference; and
adjusting the motion vector based on the determined reference motion vector.

10. The method according to claim 9, further comprising:
determining a directional vector component of the reference motion vector parallel to a physiological direction related to a geometry of at least one of the heart or a body comprising the heart; and
adjusting the motion vector based on the determined directional vector component.

11. The method according to claim 1, further comprising determining an inward vector component of the motion vector, the inward vector component being a component of the motion vector parallel to a line between the at least one first reference point and the vector point.

12. The method according to claim 1, further comprising, based on the tracking, determining a motion path of the vector point, wherein the determining of the motion vector is further based on the motion path.

13. The method according to claim 1, wherein the vector point is defined on at least one of:
the myocardium; and
the endocardial wall.

14. The method according to claim 13, further comprising:
assigning a second sub-set of the set of vector points to a second region of the heart wall;
tracking the vector points in the second sub-set over time;
based on the tracking of the vector points in the second sub-set, determining a second region motion vector of the second region indicating motion of the second region relative to a second reference;
determining a first region motion display value based on the first region motion vector;
determining a second region motion display value based on the second region motion vector; and
providing the first region motion display value and the second region motion display value for displaying on an electronic display.

15. The method according to claim 1, further comprising providing, for displaying on an electronic display, a display motion value indicating an amount of motion of the vector point relative to the reference.

16. The method according to claim 15, further comprising:
assigning a second sub-set of the set of vector points to a second region of the heart wall;
tracking the vector points in the second sub-set over time;
based on the tracking of the vector points in the second sub-set, determining a second region motion vector of the second region indicating motion of the second region relative to a second reference;

determining a first region deviation display value based on the first region motion vector and a first reference region motion value;

determining a second region deviation display value based on the second region motion vector and a second reference region motion value; and providing the first region deviation display value and the second region deviation display value for displaying on an electronic display.

17. The method according to claim 1, further comprising:

receiving a reference motion value indicating a reference amount of motion of the vector point relative to the reference;

deriving a vector motion value based on the motion vector;

calculating a motion deviation value providing an indication of a difference between the vector motion value and the reference motion value; and providing the motion deviation value for displaying on an electronic display.

18. A non-transitory computer readable medium comprising computer executable code causing a processing unit of a computer, when the code is loaded in the processing unit or a memory connected to the processing unit, to execute the method of claim 1.

19. An electronic computing device comprising:

a data acquisition module arranged to receive a sequence of images acquired consecutively in time at fixed time intervals, the images comprising image data of at least part of a heart having a heart wall, an image processing module arranged to:

identify, in each image, at least part of the heart wall;

define, in each image, at least one vector point on the heart wall; and track the vector point over time, based on the sequence;

a motion calculation module arranged to:

receive a first reference related to the heart; and determine, based on the tracking of the vector point and the reference, a motion vector indicating motion of the vector point relative to the reference, wherein the motion vector is determined as a difference vector between (i) a first vector from the vector point to the first reference at the end of the diastolic phase in a cardiac cycle, and (ii) a second vector from the vector point to the first reference at the end of the systolic phase in the cardiac cycle.

* * * * *